US010649256B2

(12) United States Patent
Cho et al.

(10) Patent No.: US 10,649,256 B2
(45) Date of Patent: May 12, 2020

(54) PANEL MODULE AND DISPLAY APPARATUS HAVING THE SAME (71) Applicant: SAMSUNG ELECTRONICS CO., LTD., Suwon-si (KR)

(72) Inventors: Min Jae Cho, Anyang-si (KR); Myeong Gil Kim, Suwon-si (KR); Seo Joon Lee, Suwon-si (KR); Hyun Jun Jung, Yongin-si (KR); Jong Hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/853,132

(22) Filed: Dec. 22, 2017

(65) Prior Publication Data

US 2018/0180930 A1 Jun. 28, 2018

(30) Foreign Application Priority Data

Dec. 28, 2016 (KR) .......................... 10-2016-0181136

(51) Int. Cl.
*G02F 1/1333* (2006.01)
*G02F 1/1345* (2006.01)
*G02F 1/1335* (2006.01)

(52) U.S. Cl.
CPC ...... *G02F 1/133308* (2013.01); *G02F 1/1333* (2013.01); *G02F 1/13452* (2013.01); *G02F 1/133528* (2013.01); *G02F 2001/13332* (2013.01); *G02F 2001/133302* (2013.01); *G02F 2001/133314* (2013.01);

(Continued)

(58) Field of Classification Search
CPC ......... G02F 1/133308; G02F 1/133528; G02F 1/13452; G02F 2001/133302; G02F 2001/133314; G02F 2001/133325; G02F 2001/133331; G02F 2202/28
See application file for complete search history.

(56) References Cited

U.S. PATENT DOCUMENTS

| | | | | |
|---|---|---|---|---|
| 8,599,327 | B2* | 12/2013 | Fujishima | ......... G02F 1/133308 349/150 |
| 2011/0019121 | A1* | 1/2011 | Mo | .................... G02F 1/133308 349/58 |
| 2011/0038112 | A1* | 2/2011 | Shintani | ............ G02F 1/133308 361/679.01 |

(Continued)

FOREIGN PATENT DOCUMENTS

| | | |
|---|---|---|
| KR | 10-2008-0037392 A | 4/2008 |
| KR | 10-2012-0100429 A | 9/2012 |

(Continued)

OTHER PUBLICATIONS

International Search Report (PCT/ISA/210) dated Apr. 13, 2018 issued by the International Searching Authority in International Application No. PCT/KR2017/015326.

(Continued)

*Primary Examiner* — Nathanael R Briggs
(74) *Attorney, Agent, or Firm* — Sughrue Mion, PLLC (57) ABSTRACT A panel module including a display panel, a chips-on-film (COF) having a first end connected to an end portion of the display panel, and a COF cover configured to extend past the first end of the COF to block the first end of the COF, the cover having a front surface formed to be coplanar with a front surface of the display panel.

20 Claims, 12 Drawing Sheets (52) U.S. Cl.
CPC ............ *G02F 2001/133325* (2013.01); *G02F 2001/133331* (2013.01); *G02F 2202/28* (2013.01)

(56) References Cited

U.S. PATENT DOCUMENTS

| | | | |
|---|---|---|---|
| 2011/0199348 A1* | 8/2011 | Takatani | G02F 1/13452 345/204 |
| 2012/0224338 A1* | 9/2012 | Park | H05K 5/02 361/752 |
| 2015/0248858 A1* | 9/2015 | Ahn | G06F 1/1601 345/82 |
| 2015/0362787 A1* | 12/2015 | Yuan | G02F 1/133308 349/58 |
| 2016/0165677 A1* | 6/2016 | Lee | H05B 33/04 313/504 |

FOREIGN PATENT DOCUMENTS

| | | |
|---|---|---|
| KR | 10-2012-0119163 A | 10/2012 |
| KR | 10-2014-0139437 A | 12/2014 |
| KR | 10-2015-0102664 A | 9/2015 |
| KR | 10-2016-0070241 A | 6/2016 |
| KR | 10-2016-0133606 A | 11/2016 |

OTHER PUBLICATIONS

Communication dated Dec. 13, 2019, issued by the Korean Intellectual Property Office in counterpart Korean Application No. 10-2016-0181136.

* cited by examiner

PANEL MODULE AND DISPLAY APPARATUS HAVING THE SAME

CROSS-REFERENCE TO RELATED APPLICATION

This application claims priority from Korean Patent Application No. 10-2016-0181136, filed on Dec. 28, 2016 in the Korean Intellectual Property Office, the disclosure of which is incorporated herein by reference in its entirety.

BACKGROUND

1. Field

Methods and apparatuses consistent with example embodiments relate to a panel module configured to allow a minimized bezel formed on a periphery of a display panel, and a display apparatus having the same.

2. Description of the Related Art

A display apparatus is an apparatus configured to receive image signals and display a screen, such as a television, a monitor, etc.

Display apparatuses may include a display panel configured to display a screen, such as a liquid crystal display panel configured to display color through liquid crystals.

A liquid crystal display panel includes a pair of glass substrates formed in a flat plate shape and liquid crystals disposed between the two glass substrates, wherein the liquid crystal display panel is connected to a source printed circuit board through a chips-on-film (COF) and may receive an image signal of the source printed circuit board through the COF.

SUMMARY

Example embodiments provide a panel module configured to allow a minimized width of a bezel supporting outer sides of a display panel, and a display apparatus having the same.

According to an aspect of an example embodiment, there is provided panel module including: a display panel; a chips-on-film (COF) having a first end connected to an end portion of the display panel; and a cover configured to extend past the first end of the COF to block the first end of the COF, the cover having a front surface formed to be coplanar with a front surface of the display panel.

The panel module may include an adhesive material configured to attach the cover to the display panel.

The adhesive material may be formed of a photocurable resin.

The display panel may include: a first glass substrate having a flat plate shape; a second glass substrate formed in a flat plate shape and disposed in front of the first glass substrate; a liquid crystal layer formed between the first glass substrate and the second glass substrate; a first polarizing filter disposed on a rear surface of the first glass substrate; and a second polarizing filter disposed on a front surface of the second glass substrate, wherein the front surface of the cover may be formed to be coplanar with a front surface of the second polarizing filter.

The cover may include a front portion having a first end in contact with the second polarizing filter and a side portion extending rearward from a second end of the front portion.

The adhesive material may be cured in a state of being filled in a space formed by first ends of the first glass substrate and the second glass substrate, and inner surfaces of the front portion of the cover and the side portion of the cover.

The panel module may include a source printed circuit board connected to a second end of the COF.

The source printed circuit board may be disposed to be spaced apart from a rear side of the display panel; and the COF may be bent in a U shape such that a front end of the COF is connected to the end portion of the display panel and a rear end of the COF is connected to the source printed circuit board.

The cover may be formed of a metal material.

According to an aspect of another example embodiment, there is provided a display apparatus including: a display panel; a source printed circuit board disposed behind the display panel; a chips-on-film (COF) having a first end connected to an end portion of the display panel and a second end connected to the source printed circuit board; a cover configured to extend past the first end of the COF to block the first end of the COF, the cover having a front surface formed to be coplanar with a front surface of the display panel; and a frame case configured to support a periphery of the display panel and the cover.

The cover may include a front portion having a first end in contact with the display panel and a side portion extending rearward from a second end of the front portion.

The display apparatus may include an adhesive material configured to attach the cover to the display panel.

The adhesive material may be formed of a photocurable resin.

The display apparatus may include an adhesive material configured to attach the cover to the display panel, wherein: the cover includes a front portion having a first end in contact with the display panel and a side portion extending rearward from a second end of the front portion; and the adhesive material may be cured in a state of being filled in a space formed by a first end of the display panel and inner surfaces of the front portion and the side portion.

The display panel may include: a first glass substrate having a flat plate shape; a second glass substrate disposed in front of the first glass substrate; a liquid crystal layer formed between the first glass substrate and the second glass substrate; a first polarizing filter disposed on a rear surface of the first glass substrate; and a second polarizing filter disposed on a front surface of the second glass substrate, wherein the front surface of the cover may be formed to be coplanar with a front surface of the second polarizing filter.

The COF may include: a film printed circuit board formed in a film form and having a first end connected to the display panel; and a semiconductor chip mounted on the film printed circuit board, and wherein the cover may be configured to block the first end of the film printed circuit board.

The display panel may be deformed to be bent so that both end portions of the display panel protrude frontward; and the cover may be deformed to be bent so that both end portions of the cover protrude frontward to correspond to the display panel.

The frame case may include a supporter protruding inward that is attached to a periphery of a rear surface of the display panel.

The frame case may be bent so that both end portions of the frame case protrude frontward, and wherein the display panel and the cover may be supported by the frame case and deformed to be bent so that end portions of the display panel and the cover protrude frontward.

The display apparatus may include a bottom chassis disposed behind the display panel, wherein the source printed circuit board may be disposed behind the display panel.

DETAILED DESCRIPTION

Example embodiments described below and illustrated in the drawings are merely examples, and various modifications may be made to the example embodiments and the drawings.

Further, identical marks or numbers in the drawings of the description denote components or elements configured to perform substantially identical functions.

Further, terms used herein are for the purpose of describing example embodiments and are not intended to limit the present disclosure. As used herein, the singular forms "a," "an," and "the" are intended to include the plural forms as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, the term "and/or" includes combinations of one or more of a plurality of associated listed items or any and all items among the plurality of associated listed items.

Further, the terms "upper portion," "lower portion," "upper end," and "lower end" are defined on the basis of the drawings, and a shape and location of each component are not limited by the terms.

Below, a display apparatus according to an example embodiment will be described in detail with reference to the accompanying drawings.

Figure 1:
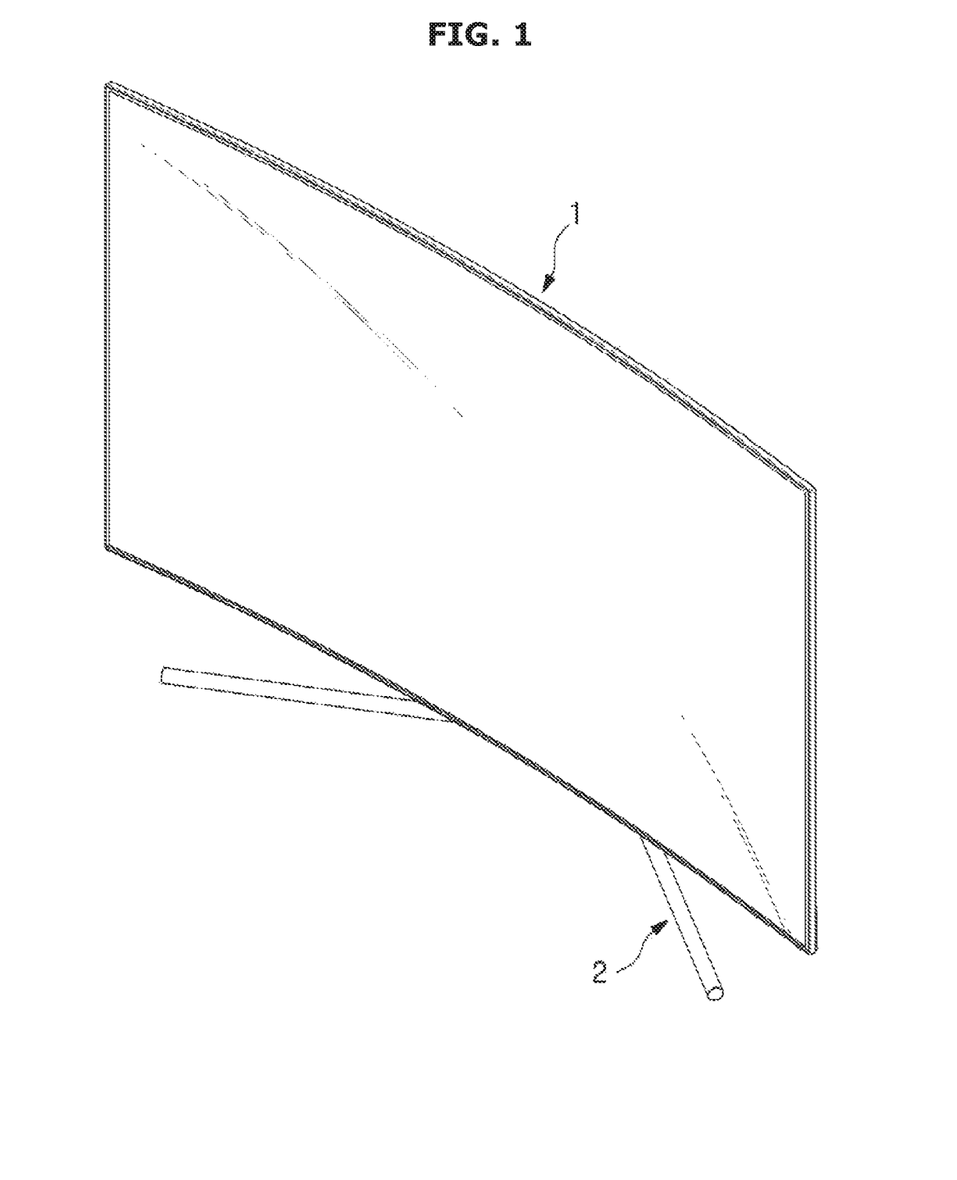
FIG. 1 is a perspective view illustrating a display apparatus according to an example embodiment.

As illustrated in FIG. 1, a display apparatus according to an example embodiment includes a display unit 1 on which a screen is displayed, and a stand 2 configured to support the display unit 1. According to an example embodiment, the display unit 1 is formed in a bent shape such that both ends thereof protrude frontward.

Figure 2:
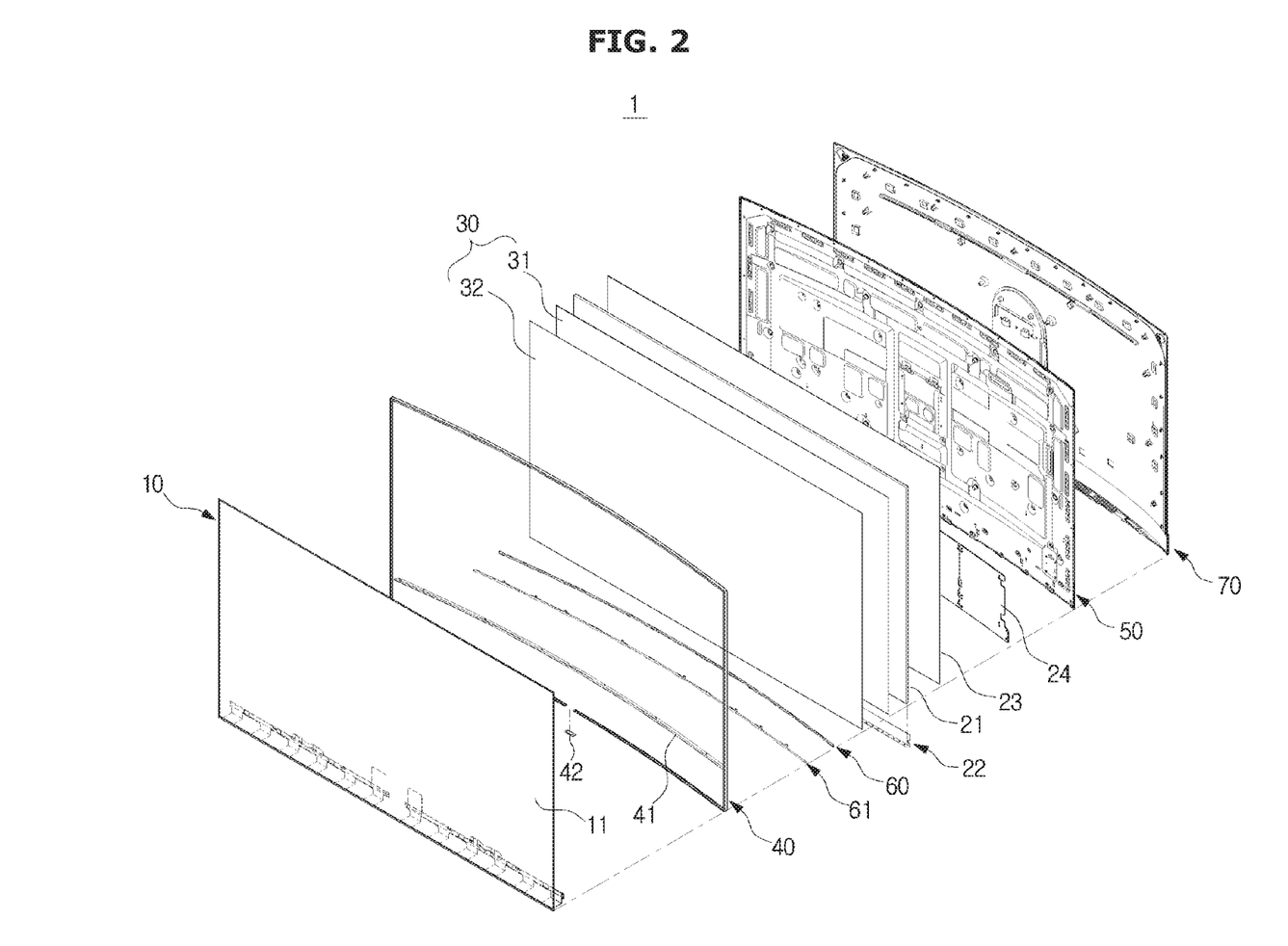
FIG. 2 is a front exploded perspective view illustrating the display apparatus according to an example embodiment.
Figure 3:
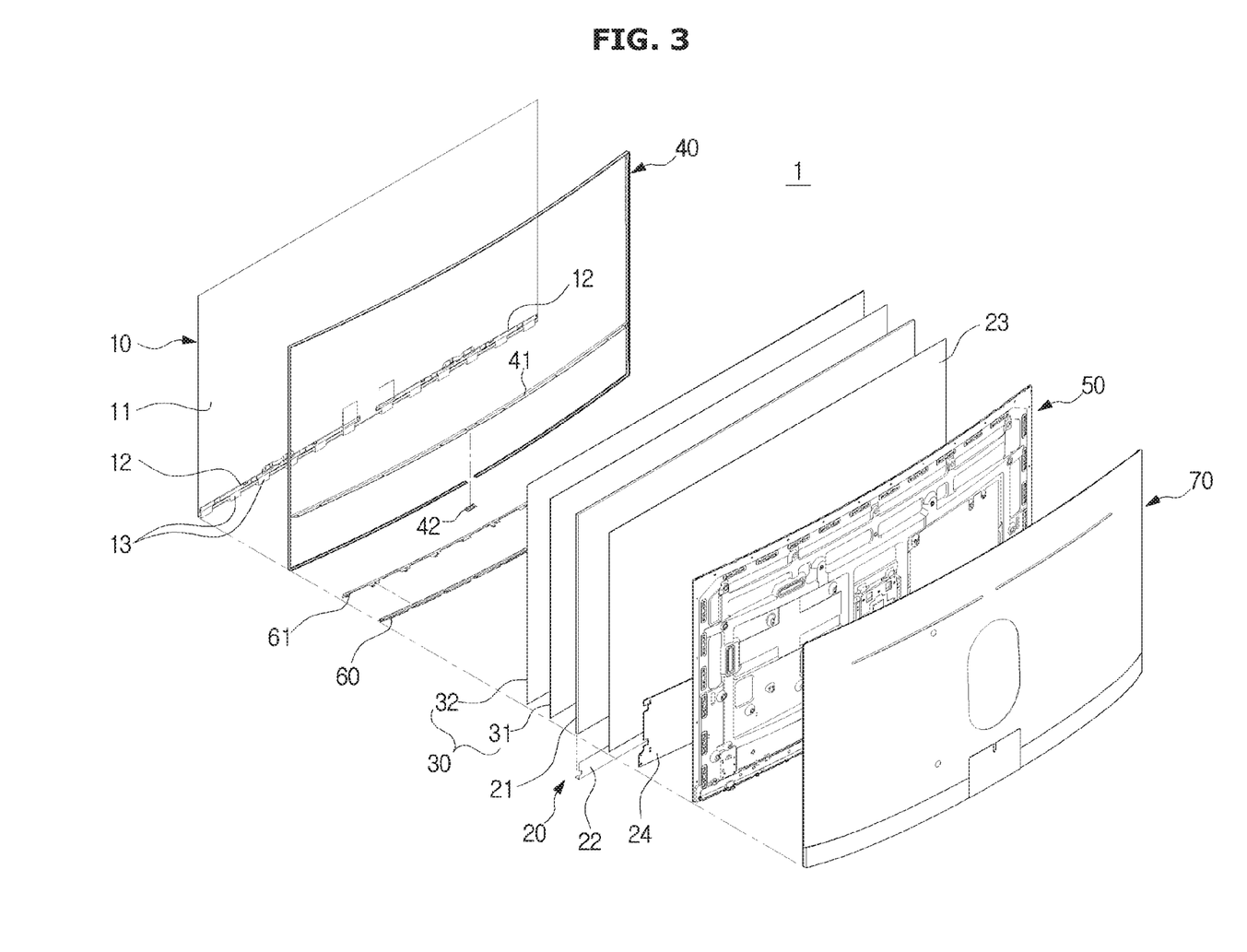
FIG. 3 is a rear exploded perspective view illustrating the display apparatus according to an example embodiment.

As illustrated in FIGS. 2 and 3, the display unit 1 includes a panel module 10 including a display panel 11 on which a screen is displayed, a back light 20 disposed behind the display panel 11 and configured to supply light to the display panel 11, and optical sheets 30 disposed between the display panel 11 and the back light 20 and configured to improve a characteristic of the light supplied from the back light 20. The optical sheets 30 include a diffuser sheet 31 configured to receive and diffuse light emitted frontward from the light guide plate 21, and a dual brightness enhancement film (DBEF) sheet 32 that is disposed in front of the diffuser sheet 31 and is a high luminance prism sheet.

Further, the display unit 1 includes a frame case 40 configured to support a periphery of the display panel 11, a bottom chassis 50 configured to accommodate and support the back light 20, a middle mold 60 coupled to a periphery of the bottom chassis 50 and configured to support the optical sheets 30, and a rear case 70 installed to cover a rear side of the bottom chassis 50 and forming a rear surface of the display unit 1. The frame case 40 includes a reinforcing member 41 coupled to an inner side of the lower portion thereof, and a cover member 42 coupled to a center of the reinforcing member 41 and configured to cover both of the separated ends of the bar shape member. A middle front 61 configured to support the lower portion of the display panel 11 is coupled to a front side of the middle mold 60.

The panel module 10 includes the display panel 11, a source printed circuit board 12 configured to control the display panel 11, and a plurality of chips-on-films (COFs) 13 configured to connect the display panel 11 and the source printed circuit board 12.

Figure 4:
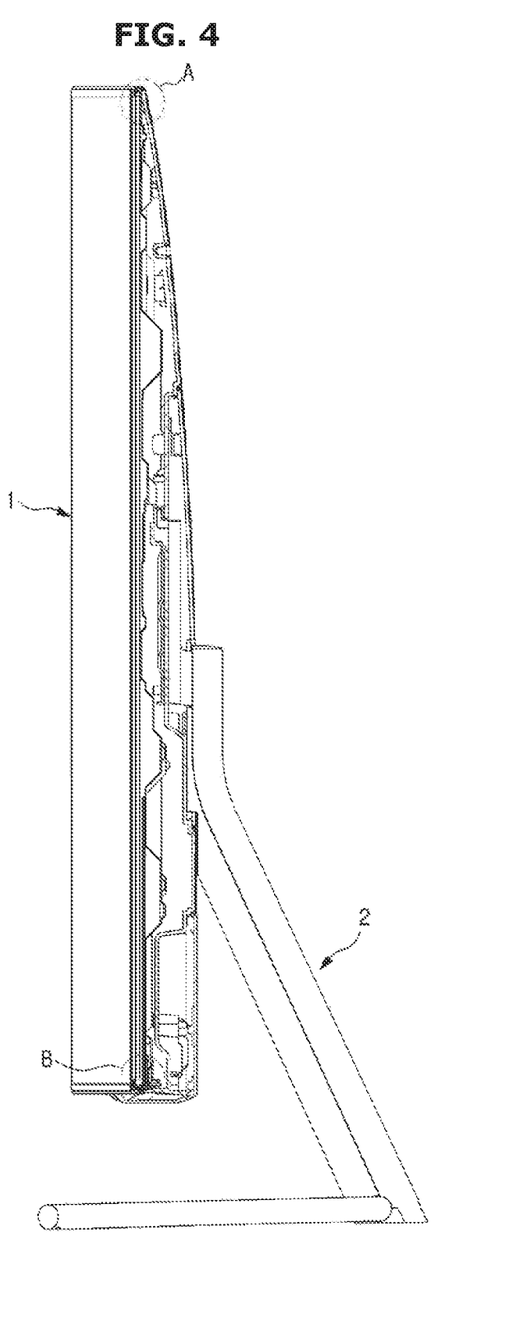
FIG. 4 is a cross-sectional view illustrating the display apparatus according to an example embodiment.

FIG. 4 is a cross-sectional view illustrating the display apparatus according to an example embodiment.

Figure 5:
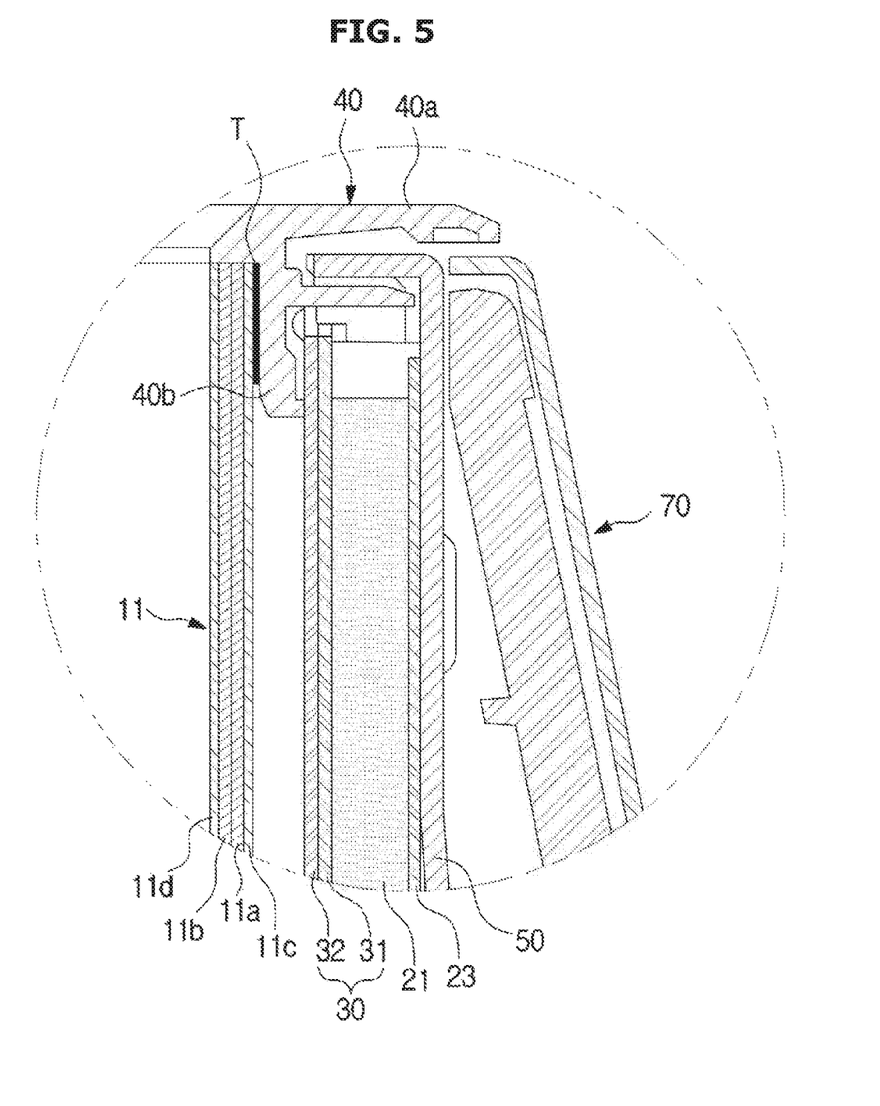
FIG. 5 is an enlarged view illustrating portion A of FIG. 4, according to an example embodiment.

FIG. 5 is an enlarged view illustrating portion A of FIG. 4, according to an example embodiment.

Figure 6:
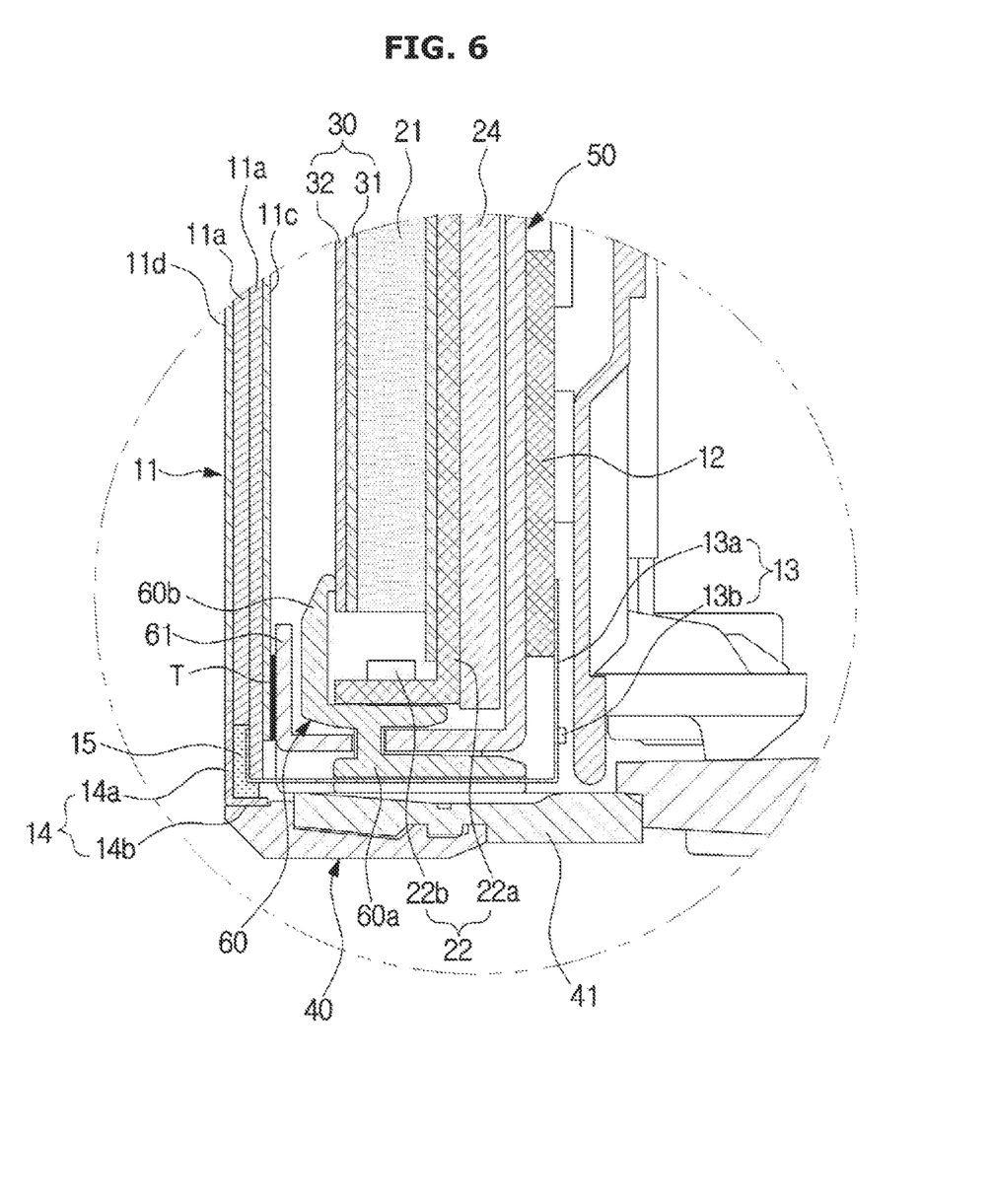
FIG. 6 is an enlarged view illustrating a portion B of FIG. 4, according to an example embodiment.

FIG. 6 is an enlarged view illustrating a portion B of FIG. 4, according to an example embodiment.

As illustrated in FIGS. 4 to 6, the display panel 11 includes a first glass substrate 11a formed in a quadrangular flat plate shape, a second glass substrate 11b formed in a quadrangular flat plate shape and disposed in front of the first glass substrate 11a, and a liquid crystal layer disposed between the first glass substrate 11a and the second glass substrate 11b.

Further, the display panel 11 includes a first polarizing filter 11c disposed on a rear surface of the first glass substrate 11a, and a second polarizing filter 11d disposed on a front surface of the second glass substrate 11b such that a front surface of the second polarizing filter 11d forms a front surface of the display panel 11.

A lower end of the first glass substrate 11a is formed to be stepped with respect to a lower end of the second glass substrate 11b such that a lower portion of a front surface of the first glass substrate 11a is exposed frontward, and the second glass substrate 11b is formed to be stepped with respect to the second polarizing filter 11d such that a lower portion of the front surface of the second glass substrate 11b is exposed frontward.

Accordingly, a lower end of the display panel 11 has a step formed between the second polarizing filter 11d and the second glass substrate 11b, and a step formed between the second glass substrate 11b and the first glass substrate 11a.

Because an inactive area on which a screen is not displayed is formed on the periphery of the display panel 11, a black mask is formed between the first glass substrate 11a and the second glass substrate 11b so that the light from the back light 20 is prevented from leaking through the inactive area of the display panel 11.

The source printed circuit board 12 is disposed to be spaced apart from a rear side of the display panel 11, the COFs 13 are bent in an approximately U shape and connect the display panel 11 and the source printed circuit board 12. As described above, because the source printed circuit board 12 is disposed behind the display panel 11, a bezel of display apparatus formed by the frame case 40 may be minimized.

Further, as illustrated in FIG. 3, the panel module 10 includes two source printed circuit boards 12 laterally disposed behind a lower portion of the bottom chassis 50 in parallel, and the two source printed circuit boards 12 are connected to the display panel 11 through the plurality of the COFs 13.

Figure 8:
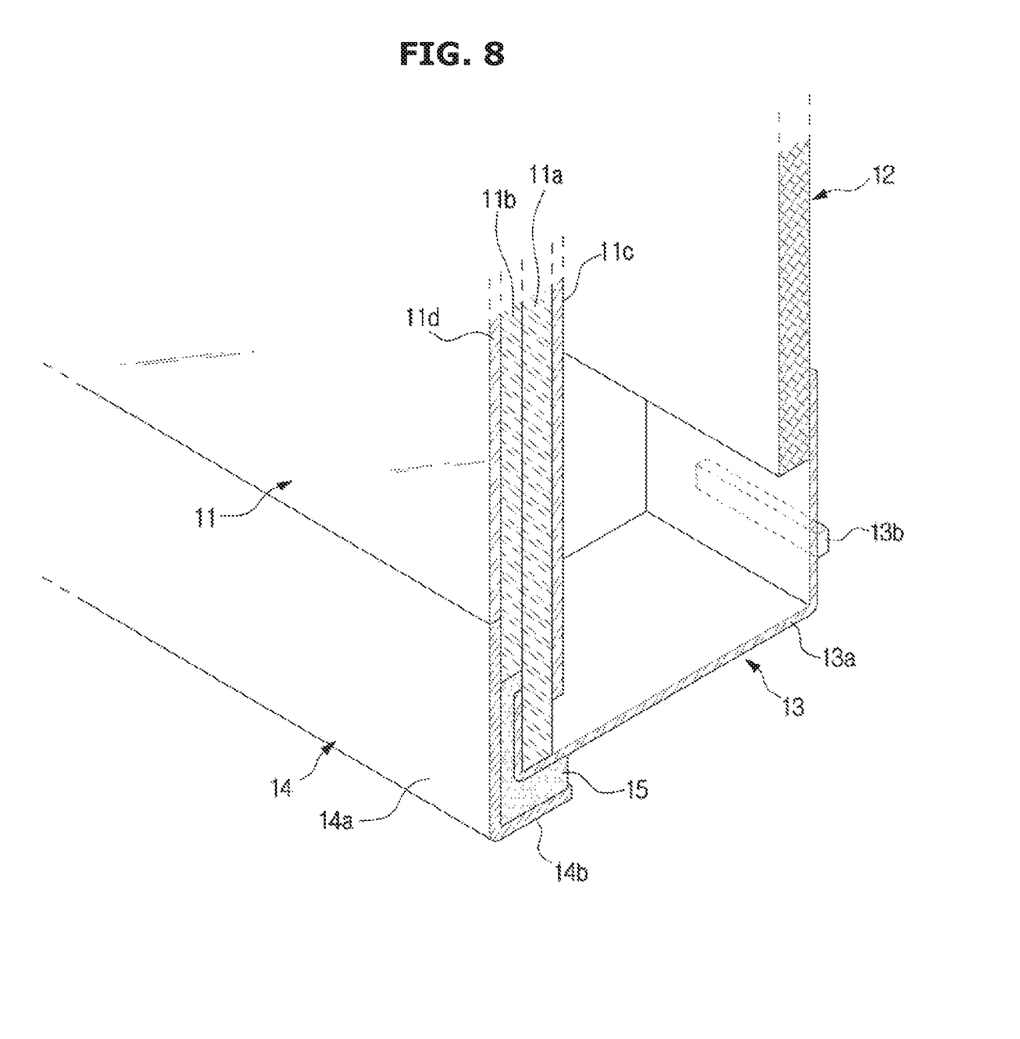
FIG. 8 is a cross-sectional perspective view illustrating a configuration of a panel module in the display apparatus according to an example embodiment.

As illustrated in FIG. 8, each of the plurality of the COFs 13 includes a film printed circuit board 13a formed in a film form and a semiconductor chip 13b mounted on the film printed circuit board 13a. One end of the film printed circuit board 13a is connected to the lower end of the display panel 11, and the other end of the film printed circuit board 13a is connected to the source printed circuit board 12 such that image signals are transmitted from the source printed circuit boards 12 to the display panel 11.

Because one end of the COFs 13 are connected to the exposed lower portion of the front surface of the first glass substrate 11a, the one end of the COFs 13 are exposed frontward.

Accordingly, the panel module 10 includes a COF cover 14 configured to cover and hide the one end of the COFs 13 connected to a lower portion of the display panel 11.

The COF cover 14 is formed of a metal material to have sufficient strength so as to reduce deformation thereof, and is laterally elongated to correspond to the lower end of the display panel 11. According to an example embodiment, the COF cover 14 is formed from a stainless steel metal plate.

A front surface of the COF cover 14 is formed to be coplanar with the front surface of the second polarizing filter 11d forming the front surface of the display panel 11 such that the COF cover 14 forms a front surface of the display unit 1 with the display panel 11.

The COF cover 14 has a thickness smaller than or equal to that of the second polarizing filter 11d, and includes a front portion 14a having an upper end in contact with a lower end of the first polarizing filter 11c of the display panel 11, and a side portion 14b extending rearward from a lower end of the front portion 14a.

A front surface of the front portion 14a is formed to be coplanar with a front surface of the first polarizing filter 11c and covers and hides the one end of the COFs 13, and the side portion 14b is formed by bending a lower portion of the COF cover 14 rearward.

Further, the COF cover 14 serves to cover and hide the steps formed between the second glass substrate 11b and the second polarizing filter 11d and between the first glass substrate 11a and the second glass substrate 11b.

The COF cover 14 is attached to the first glass substrate 11a and the second glass substrate 11b by an adhesive material 15 so as to be attached to the lower end of the display panel 11.

The adhesive material 15 is applied to fill a space formed between the COF cover 14 and the lower ends of the first glass substrate 11a and the second glass substrate 11b and is then cured to fix the COF cover 14 on the lower end of the display panel 11 so that the COF cover 14 looks like the lower end of the display panel.

According to an example embodiment, the adhesive material 15 is formed of a photocurable resin that is an ultraviolet curable resin.

The back light 20 includes a light guide plate 21 formed in a quadrangular plate shape, a light source 22 disposed to face a lower end of the light guide plate 21 and configured to generate light, and a white reflective sheet 23 disposed on a rear surface of the light guide plate 21 and configured to reflect light. Further, a radiation panel 24 configured to diffuse and easily dissipate heat generated by the light source 22 is disposed on a lower portion of a rear surface of the reflective sheet 23.

Referring again to FIGS. 5 and 6, the light source 22 includes a printed circuit board 22a laterally elongated to correspond to a lower end of the light guide plate 21, and a plurality of light emitting diodes 22b disposed on the printed circuit board 22a to be laterally separated from each other and generate light.

The optical sheets 30 include a diffuser sheet 31 configured to receive and diffuse light emitted frontward from the light guide plate 21, and a dual brightness enhancement film (DBEF) sheet 32 that is disposed in front of the diffuser sheet 31 and is a high luminance prism sheet.

The frame case 40 is formed in a quadrangular ring shape and supports the periphery of the display panel 11 formed in the quadrangular plate shape and the side portion 14b of the COF cover 14. The frame case 40 is bent so that both end portions thereof protrude frontward. Because the frame case 40 supports the display panel 11, the display panel 11 is formed in a flat plate shape and deformed to be bent so that both end portions thereof protrude frontward such that the display panel 11 corresponds to the frame case 40 in a process of being installed on and supported by the frame case 40.

The frame case 40 includes a frame 40a disposed to surround outer ends of the display panel 11 and forming a bezel of the display unit 1, and a supporter 40b protruding inward from the frame 40a to support a rear periphery of the display panel 11. Further, a protrusion configured to support a front surface of the light guide plate 21 is formed to protrude rearward from a rear surface of the supporter 40b. According to an example embodiment, the supporter 40b is formed on each of an upper portion and both side portions of the frame case 40, an upper portion and both side portions of a rear surface of the display panel 11a re attached to a front surface of the supporter 40b by an adhesive part T such as a double-sided tape, and the protrusion protruding from the rear surface of the supporter 40b supports an upper portion and peripheries of both side portions of the front surface of the light guide plate 21.

According to an example embodiment, the frame case 40 manufactures a bar-shaped member formed of a metal material, and then bends the bar-shaped member so that both ends thereof face each other and the bar-shaped member is formed in a bent quadrangular ring shape. According to an example embodiment, both ends of the bar shape member face each other in a state of being separated from a center of a lower portion of the frame case 40.

The term "bar shape" describes a component having a certain length, and a cross-sectional shape thereof may be formed in various shapes such as a quadrangular shape, a circular shape, an elliptical shape, and any combination thereof.

Figure 7:
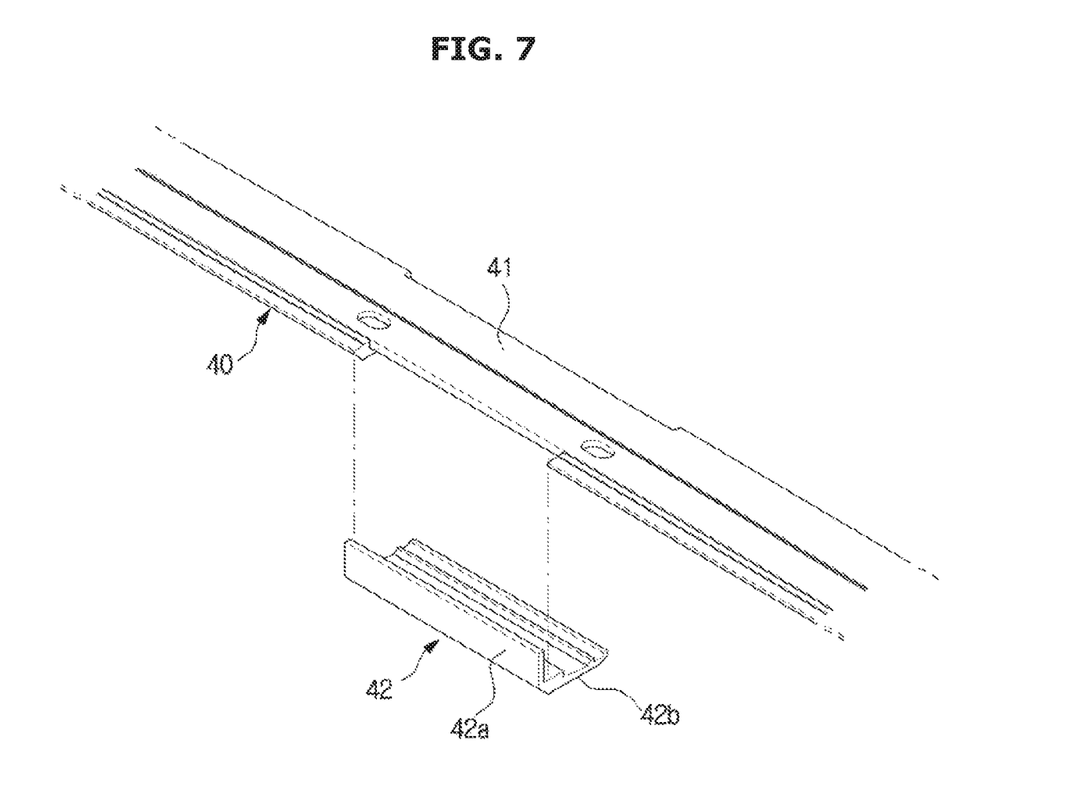
FIG. 7 is a perspective view illustrating an installation of a reinforcing member and a cover member of a frame case in the display apparatus according to an example embodiment.

Further, as illustrated in FIG. 7, the frame case 40 includes a reinforcing member 41 coupled to an inner side of the lower portion thereof, and a cover member 42 coupled to a center of the reinforcing member 41 and configured to cover both of the separated ends of the bar shape member.

The reinforcing member 41 is configured to reinforce strength of the lower portion of the frame case 40. Because both ends of the bar shape member forming the frame case 40 are separated from each other at the center of the lower portion of the frame case 40, as described above, the lower portion of the frame case 40 has lower strength than the remaining portions of the frame case 40. Accordingly, the reinforcing member 41 is coupled to the inner side of the lower portion of the frame case 40 and reinforces the strength of the lower portion of the frame case 40.

The cover member 42 is installed on the center of the reinforcing member 41 and covers and hides a space between both ends of the bar shape member forming the frame case 40. The cover member 42 includes a cover portion 42a configured to cover the space between both ends of the bar shape member, and a coupler 42b extending rearward from a lower end of the cover portion 42a and coupled to the reinforcing member 41. In this case, because a logo of a product is displayed on a front surface of cover portion 42a, the cover portion 42a may be used as a logo panel.

The middle mold 60 is formed in a bar shape and coupled to the lower portion of the bottom chassis 50 and, as illustrated in FIG. 6, includes a chassis coupler 60a coupled to the bottom chassis 50, and a light guide plate supporter 60b extending upward from the chassis coupler 60a and configured to support the front surface of the light guide plate 21. A protrusion protrudes rearward from a rear surface of the light guide plate supporter 60b and supports a lower portion of the front surface of the light guide plate 21.

A middle front 61 configured to support the lower portion of the display panel 11 is coupled to a front side of the middle mold 60. The middle front 61 is formed of a metal material and has an approximately L-shaped cross section such that a front surface thereof supports a lower surface of a rear end of the display panel 11. According to an example embodiment, a lower portion of the rear surface of the display panel 11 is attached to the front surface of the middle front 61 by a double-sided tape T. Further, the middle front 61 supports lower ends of the optical sheets 30 with the middle mold 60.

The bottom chassis 50 is formed in an approximately box shape in which a front surface is open and formed to accommodate the back light 20 therein. According to an example embodiment, the bottom chassis 50 is formed in a bent shape so that both ends thereof protrude frontward, and although the light guide plate 21 is formed in a flat plate shape, both ends thereof are deformed to be bent such that the light guide plate 21 corresponds to the bottom chassis 50 in a process of being installed on and supported by the bottom chassis 50.

Further, various types of printed circuit boards may be disposed on a rear surface of the bottom chassis 50 to control operation of the display apparatus. The printed circuit boards include a power supply substrate configured to supply power to the display unit 1, a panel driving substrate configured to drive the display panel 11, a timing control substrate configured to transmit an image signal to the display panel 11, and a signal processing substrate configured to process the image signal and a sound signal.

The rear case 70 is installed to cover the rear side of the bottom chassis 50 and covers and hides the printed circuit boards installed on the rear surface of the bottom chassis 50.

A process of attaching the COF cover 14 to the lower end of the display panel 11 will be described below.

Figure 9:
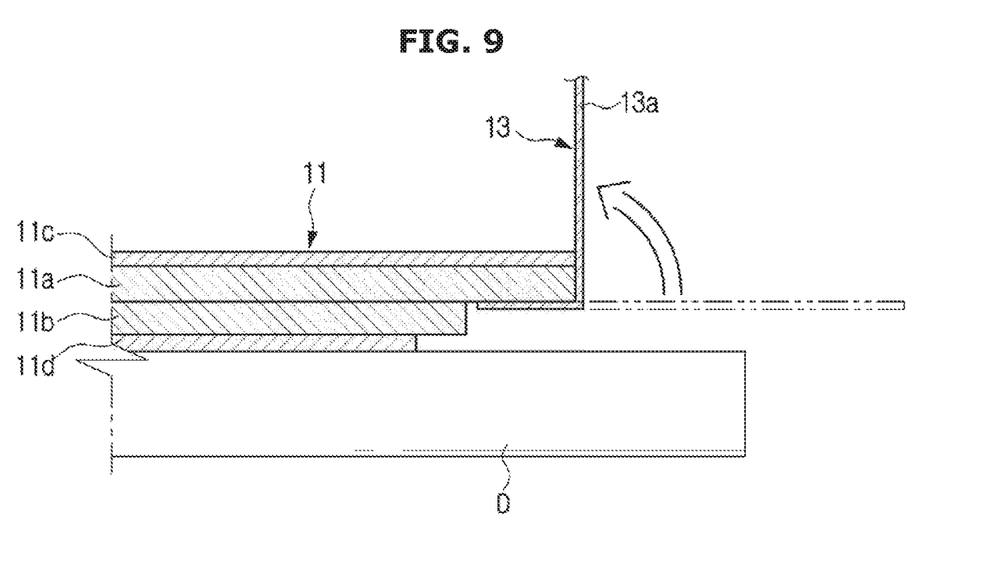
FIGS. 9 to 12 are schematic views illustrating a process of attaching a COF to a display panel in the display apparatus according to an example embodiment.
Figure 10:
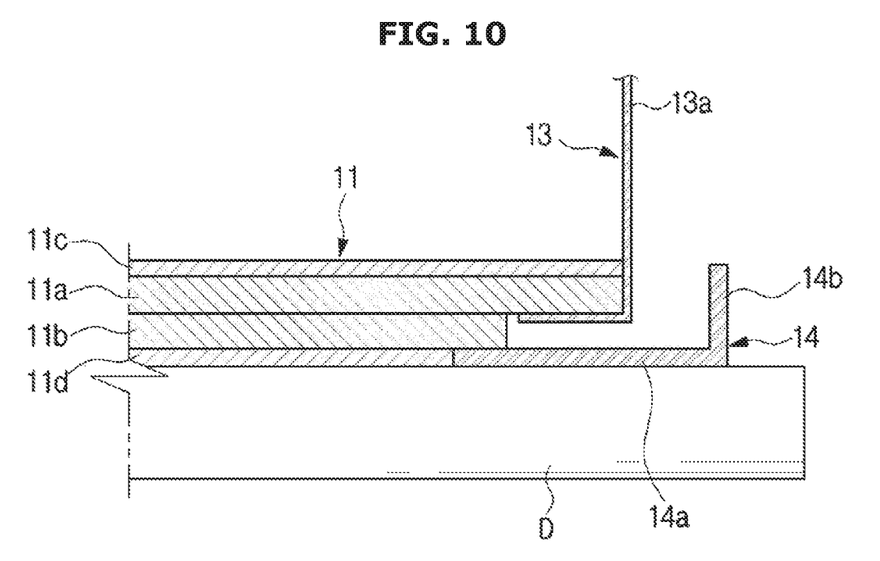

First, as illustrated in FIG. 9, the display panel 11 to which the one end of the COFs 13 are connected is mounted on an upper surface of a die D having a flat plate shape and then the film printed circuit boards 13a of the COFs 13 are bent upward. Next, as illustrated in FIG. 10, when the COF cover 14 is mounted on the die D, the front surface of the display panel 11 (that is, the front surface of the second polarizing filter 11d) and the front surface of the COF cover 14 are in contact with the upper surface of the die D and located to be coplanar.

In this case, the lower end of the display panel 11, and more specifically, a lower end of the second polarizing filter 11d (in the drawings, a right end of the second polarizing filter 11d) and an upper end of the COF cover 14 (in the drawings, a left end of the front portion 14a of the COF cover 14) are disposed to be in contact with each other.

Figure 11:
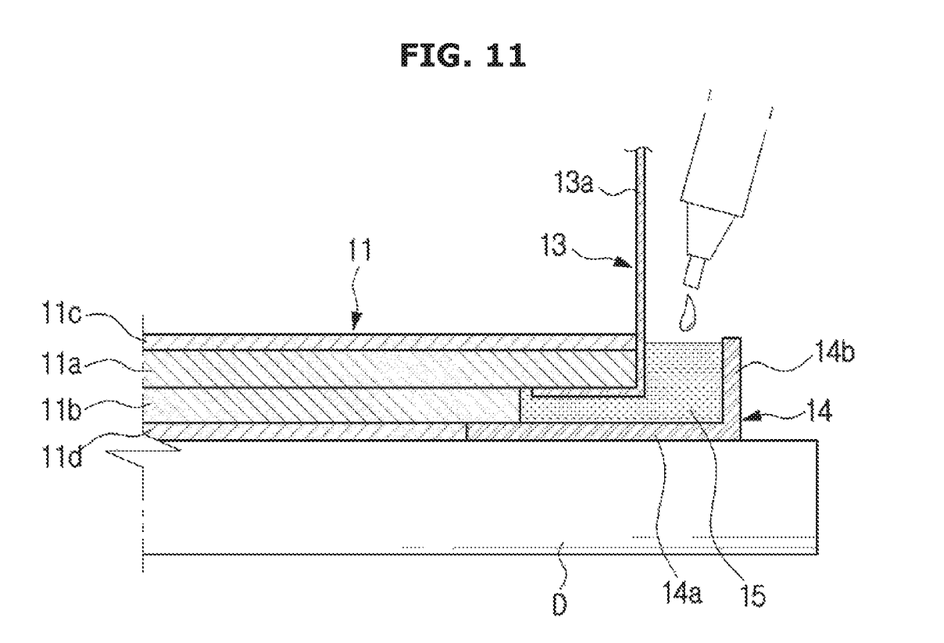
Figure 12:
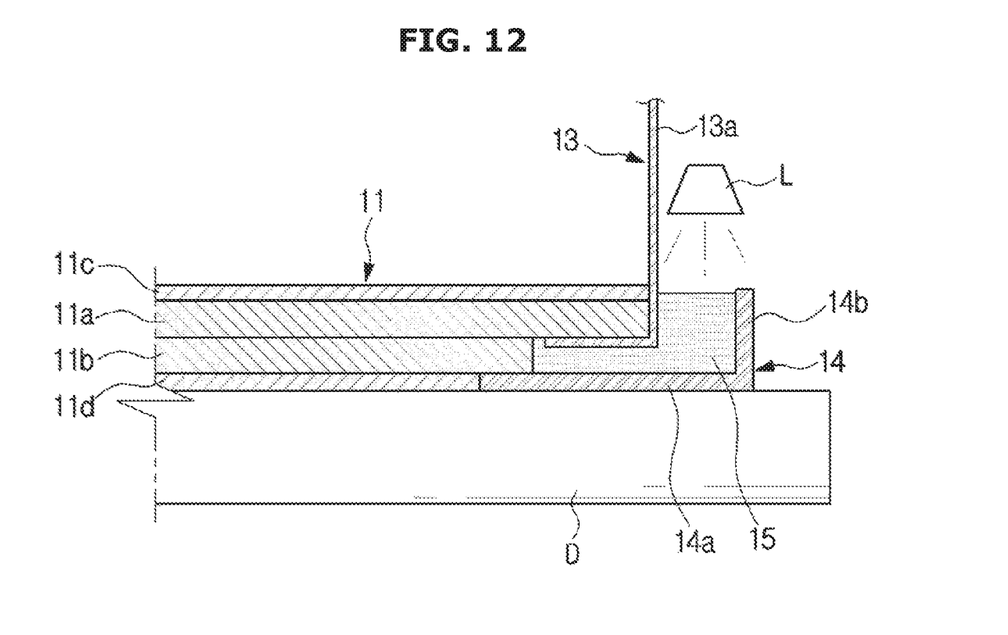

In addition, as illustrated in FIG. 11, after applying the adhesive material 15 to fill a space formed between the lower end of the display panel 11 and the COF cover 14, and more specifically, a space between the lower ends of the first glass substrate 11a and the second glass substrate 11b, a rear surface of the front portion 14a, and an upper surface of the side portion 14b, as illustrated in FIG. 12, when ultra violet light is emitted to the adhesive material 15 from an ultra-violet lamp L, the adhesive material 15 is cured such that the COF cover 14 is attached to and fixed on the lower end of the display panel 11.

As described above, because the COF cover 14 is attached to the display panel 11 by the adhesive material 15 when the front surface of the display panel 11 and the front surface of the COF cover 14 are located to be coplanar, the front surface of the second polarizing filter 11d and the front surface of the COF cover 14 are formed to be coplanar, and the one end of the COFs 13 connected to the lower portion of the display panel 11a re covered and hidden by the COF cover 14 attached to the lower end of the display panel 11.

In a related art display apparatus, a width of a bezel is formed to be more than a predetermined width to hide one end of COFs 13 connected to a display panel 11. However, according to an example embodiment, when a lower end of the display panel 11 is formed by a COF cover 14, the width of the bezel can be sharply decreased because the one end of the COFs 13 do not have to be hidden, and thus a display apparatus having a decreased width can be implemented.

According to an example embodiment, although the COFs 13 are connected to the lower end of the display panel 11 and the COF cover 14 is attached to the lower end of the display panel 11 to correspond to portions to which the COFs 13 are connected, the above is only an example, and the COF cover 14 may be attached to portions corresponding to the portions of the display panel 11 to which the COFs 13 are connected.

That is, the COF cover 14 may be attached to an upper end of the display panel 11 when the COF 13s are connected to the upper end of the display panel 11, and the COF cover 14 may be attached to the lower end and the upper end of the display panel 11 when the COF 13s are connected to the lower end and the upper end of the display panel 11.

Further, the COFs 13 may be connected to a left end and a right end of the display panel 11, and, in this case, the COF cover 14 may be attached to the left end and the right end of the display panel 11.

In addition, according to an example embodiment, although steps are formed between the lower end of the first glass substrate 11a and the lower end of the second glass substrate 11b, and between the lower end of the second glass substrate 11b and the lower end of the second polarizing filter 11d, the above is only an example, and the COF cover 14 may be disposed to cover the one end of the COFs 13 connected to the first glass substrate 11a or the second glass substrate 11b even when the steps do not exist.

In addition, according to an example embodiment, although the display panel 11 is formed with a liquid crystal panel, the above is only an example, and the COF cover 14 may be applied even when the display panel 11 is formed with an organic light emitting diode panel.

According to an example embodiment, although the source printed circuit boards 12 are disposed behind the bottom chassis 50, the above is only an example for forming a bezel formed by the frame case 40 to be thin, and the source printed circuit boards 12 are not limited thereto and may be disposed between the display panel 11 formed with an organic light emitting diode panel and the bottom chassis 50. Further, the source printed circuit boards 12 may be disposed between the outer end of the display panel 11 and an inner surface of the frame case 40 in some cases.

In addition, according to an example embodiment, although an example in which the COF cover 14 is applied to the display panel 11 deformed to be bent so that both end portions thereof protrude frontward, the COF cover 14 is not limited thereto and may be applied to the display panel 11 maintained in a flat plate shape.

As is apparent from the above description, because one end of COFs connected to one end portion of a display panel is covered and hidden by a COF cover in a display apparatus, a bezel doesn't have to cover the one end of the COFs such that a display apparatus having a bezel with a minimized width can be implemented.

The scope of the present disclosure is not limited to the example embodiments described above. Various other embodiments modifiable by those skilled in the art without departing from the spirit of the present disclosure specified in the claims may be considered as being within the scope of the present disclosure.

What is claimed is:

1. A panel module comprising:
   a display panel;
   a chips-on-film (COF) comprising:
      a front portion connected to an end portion of the display panel, and
      a side portion bent from the front portion and extending rearward with respect to the display panel;
   a cover comprising:
      a front portion configured to extend past the front portion of the COF to block the front portion of the COF, and
      a side portion bent from the front portion and extending rearward with respect to the display panel; and
   an adhesive, to attach the cover to the display panel,
   wherein the front portion and the side portion of the cover comprise a first inner surface and a second inner surface, respectively,
   the front portion of the COF comprises a second edge facing the end portion of the display panel and a third inner surface facing the first inner surface,
   the side portion of the COF comprises a fourth inner surface facing the second inner surface,
   a part of the adhesive is disposed between the end portion of the display panel, the second edge of the COF, and the first inner surface, and
   another part of the adhesive is disposed between the first inner surface and the third inner surface, and between the second inner surface and the fourth inner surface.

2. The panel module according to claim 1, wherein the adhesive is formed of a photocurable resin and wherein the cover is formed of metal.

3. The panel module according to claim 1, wherein the display panel comprises:
   a first glass substrate having a flat plate shape;
   a second glass substrate formed in a flat plate shape and disposed in front of the first glass substrate;
   a liquid crystal layer formed between the first glass substrate and the second glass substrate;
   a first polarizing filter disposed on a rear surface of the first glass substrate; and
   a second polarizing filter disposed on a front surface of the second glass substrate,
   wherein the front surface of the cover is formed to be coplanar with a front surface of the second polarizing filter, and
   wherein the adhesive is formed within a thickness of the second glass substrate.

4. The panel module according to claim 3, wherein the front portion of the cover has a first end in contact with the second polarizing filter and the side portion of the cover extends rearward from a second end of the front portion of the cover, the second end opposing the first end.

5. The panel module according to claim 4, wherein the adhesive is cured in a state of being filled in a space formed by ends of the first glass substrate and the second glass substrate, and inner surfaces of the front portion of the cover and the side portion of the cover.

6. The panel module according to claim 1, further comprising a source printed circuit board connected to a rear portion of the COF.

7. The panel module according to claim 6, wherein:
   the source printed circuit board is disposed to be spaced apart from a rear side of the display panel; and
   the rear portion of the COF is bent from the side portion of the COF so that the COF is bent in a U shape.

8. The panel module according to the claim 1, wherein the cover is formed of a metal material.

9. A display apparatus comprising:
   a display panel;
   a source printed circuit board disposed behind the display panel;
   a chips-on-film (COF) comprising:
      a front portion connected to an end portion of the display panel, a side portion bent from the front portion and extending rearward with respect to the display panel, and a rear portion connected to the source printed circuit board;
   a cover comprising:
   a front portion configured to extend past the front portion of the COF, to block the front portion of the COF, and a side portion bent from the front portion and extending rearward with respect to the display panel;
   a frame case configured to support a periphery of the display panel and the cover; and
   an adhesive to attach the cover to the display panel,
   wherein the front portion and the side portion of the cover comprise a first inner surface and a second inner surface, respectively,
   the front portion of the COF comprises a second edge facing the end portion of the display panel and a third inner surface facing the first inner surface,
   the side portion of the COF comprises a fourth inner surface facing the second inner surface, a part of the adhesive is disposed between the end portion of the display panel, the second edge of the COF, and the first inner surface, and another part of the adhesive is disposed between the first inner surface and the third inner surface, and between the second inner surface and the fourth inner surface.

10. The display apparatus according to claim 9, wherein the front portion of the cover includes a first end in contact with the display panel and the side portion of the cover extends rearward from a second end of the front portion of the cover, the second end being opposite to the first end of the front portion of the cover.

11. The display apparatus according to claim 9, wherein the adhesive is formed of a photocurable resin.

12. The display apparatus according to claim 10, wherein: the adhesive is cured in a state of being filled in a space formed by the end portion of the display panel and inner surfaces of the front portion and the side portion, of the cover.

13. The display apparatus according to claim 9, wherein the display panel comprises:
a first glass substrate having a flat plate shape;
a second glass substrate disposed in front of the first glass substrate;
a liquid crystal layer formed between the first glass substrate and the second glass substrate;
a first polarizing filter disposed on a rear surface of the first glass substrate; and
a second polarizing filter disposed on a front surface of the second glass substrate,
wherein the front surface of the cover is formed to be coplanar with a front surface of the second polarizing filter.

14. The display apparatus according to claim 9, wherein the COF comprises:
a film printed circuit board formed as a film; and
a semiconductor chip mounted on the rear portion of the film printed circuit board.

15. The display apparatus according to claim 9, wherein:
the display panel is deformed to be bent so that both end portions of the display panel protrude frontward; and
the cover is deformed to be bent so that both end portions of the cover protrude frontward to correspond to the display panel.

16. The display apparatus according to claim 9, wherein the frame case comprises a supporter protruding inward that is attached to a periphery of a rear surface of the display panel.

17. The display apparatus according to claim 9, wherein the frame case is bent so that both end portions of the frame case protrude frontward, and
wherein the display panel and the cover are supported by the frame case and deformed to be bent so that end portions of the display panel and the cover protrude frontward.

18. The display apparatus according to claim 9, further comprising a bottom chassis disposed behind the display panel,
wherein the source printed circuit board is disposed behind the display panel.

19. The panel module according to claim 1, wherein the adhesive directly contacts the cover and the COF.

20. The panel module according to claim 1, wherein the display panel comprises:
a first glass substrate having a flat plate shape;
a second glass substrate formed in a flat plate shape and disposed in front of the first glass substrate;
a liquid crystal layer formed between the first glass substrate and the second glass substrate;
a first polarizing filter disposed on a rear surface of the first glass substrate; and
a second polarizing filter disposed on a front surface of the second glass substrate,
wherein the front surface of the cover is coplanar with a front surface of the second polarizing filter,
wherein the front portion of the cover has a first end which is in contact with the second polarizing filter,
wherein the side portion of the cover extends rearward from a second end of the front portion of the cover, the second end being opposite to the first end of the front portion of the cover,
wherein a thickness of the cover is smaller than or equal to a thickness of the second polarizing filter, and
wherein the another part of the adhesive is thicker than the part of the adhesive.

* * * * *